(12) United States Patent
Nakai et al.

(10) Patent No.: US 7,713,608 B2
(45) Date of Patent: May 11, 2010

(54) SILVER ALLOY REFLECTIVE FILMS FOR OPTICAL INFORMATION RECORDING MEDIA, SILVER ALLOY SPUTTERING TARGETS THEREFOR, AND OPTICAL INFORMATION RECORDING MEDIA

(75) Inventors: Junichi Nakai, Kobe (JP); Yuki Tauchi, Kobe (JP); Hideo Fujii, Kobe (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 260 days.

(21) Appl. No.: 11/425,068

(22) Filed: Jun. 19, 2006

(65) Prior Publication Data

US 2007/0020426 A1 Jan. 25, 2007

(30) Foreign Application Priority Data

Jul. 22, 2005 (JP) .............................. 2005-213203

(51) Int. Cl.
*B32B 3/02* (2006.01)
(52) U.S. Cl. ................. 428/64.1; 428/64.4; 430/270.12
(58) Field of Classification Search ................ 428/64.1, 428/64.4; 430/270.12
See application file for complete search history.

(56) References Cited

U.S. PATENT DOCUMENTS

| | | | |
|---|---|---|---|
| 4,998,239 A * | 3/1991 | Strandjord et al. ....... 369/275.1 |
| 5,948,497 A | 9/1999 | Hatwar et al. | |
| 5,989,669 A * | 11/1999 | Usami ........................ 428/64.1 |
| 6,007,889 A | 12/1999 | Nee | |
| 6,177,186 B1 | 1/2001 | Skoog et al. | |
| 6,229,785 B1 | 5/2001 | Kitaura et al. | |
| 6,280,811 B1 | 8/2001 | Nee | |
| 6,544,616 B2 | 4/2003 | Nee | |
| 6,689,444 B2 * | 2/2004 | Nakai et al. ................ 428/64.1 |
| 7,022,384 B2 | 4/2006 | Fujii et al. | |

(Continued)

FOREIGN PATENT DOCUMENTS

CN 1483852 3/2004

(Continued)

OTHER PUBLICATIONS

U.S. Appl. No. 11/428,045, filed Jun. 30, 2006, Fujii, et al.

(Continued)

*Primary Examiner*—Elizabeth Mulvaney
(74) *Attorney, Agent, or Firm*—Oblon, Spivak, McClelland, Maier & Neustadt, L.L.P.

(57) ABSTRACT

A silver alloy reflective film is used in an optical information recording medium and contains Ag as a main component, a total of 1 to 10 atomic percent of at least one selected from Nd, Gd, Y, Sm, La, and Ce, and a total of 2 to 10 atomic percent of at least one selected from Li, Mg, Al, Zn, Cu, Pt, Au, Pd, Ru, and Rh. The reflective film preferably further contains 0.01 to 3 atomic percent of at least one of Bi and Sb and/or 2 to 10 atomic percent of at least one selected from In, Sn, and Pb. An optical information recording medium includes the silver alloy reflective film. A silver alloy sputtering target has the same composition as the silver alloy reflective film.

14 Claims, 1 Drawing Sheet

U.S. PATENT DOCUMENTS

| | | |
|---|---|---|
| 2002/0034603 A1 | 3/2002 | Nee |
| 2002/0150772 A1 | 10/2002 | Nakai et al. |
| 2003/0003395 A1 | 1/2003 | Yuzurihara et al. |
| 2003/0143342 A1* | 7/2003 | Fujii et al. .................... 428/1.1 |
| 2003/0180177 A1* | 9/2003 | Murata ........................ 420/503 |
| 2004/0028912 A1 | 2/2004 | Tauchi et al. |
| 2004/0048193 A1* | 3/2004 | Lichtenberger et al. 430/270.11 |
| 2004/0226818 A1 | 11/2004 | Takagi et al. |
| 2004/0238356 A1 | 12/2004 | Matsuzaki et al. |
| 2004/0258872 A1 | 12/2004 | Nee |
| 2004/0263984 A1 | 12/2004 | Nakai et al. |
| 2005/0008883 A1 | 1/2005 | Takagi et al. |
| 2005/0089439 A1 | 4/2005 | Keduka et al. |
| 2005/0112019 A1 | 5/2005 | Nakai et al. |
| 2005/0153162 A1 | 7/2005 | Takagi et al. |
| 2005/0238839 A1 | 10/2005 | Takagi et al. |
| 2005/0287333 A1 | 12/2005 | Takagi et al. |
| 2006/0013988 A1 | 1/2006 | Tauchi et al. |
| 2006/0104853 A1 | 5/2006 | Tauchi et al. |
| 2006/0171842 A1 | 8/2006 | Tauchi et al. |
| 2006/0182991 A1 | 8/2006 | Tauchi et al. |

FOREIGN PATENT DOCUMENTS

| | | | |
|---|---|---|---|
| EP | 0 329 122 A2 | | 8/1989 |
| EP | 1 122 723 A1 | | 8/2001 |
| EP | 1 575 035 A1 | | 9/2005 |
| EP | 1 736 559 A1 | | 12/2006 |
| JP | 61110737 A | * | 5/1986 |
| JP | 3-142728 | | 6/1991 |
| JP | 4-28032 | | 1/1992 |
| JP | 4-252440 | | 9/1992 |
| JP | 5-258363 | | 10/1993 |
| JP | 6-208732 | | 7/1994 |
| JP | 2000-57627 | | 2/2000 |
| JP | 2001-184725 | | 7/2001 |
| JP | 2002-15464 | | 1/2002 |
| JP | 2002319185 A | * | 10/2002 |
| JP | 2003-160826 | | 6/2003 |
| JP | 2004-139712 | | 5/2004 |
| JP | 2004-158145 | | 6/2004 |
| JP | 2004217986 A | * | 8/2004 |
| TW | 1233533 | | 6/2005 |
| WO | WO 94/00840 | | 1/1994 |
| WO | WO98/09823 | | 3/1998 |
| WO | WO 2004/006228 A2 | | 1/2004 |
| WO | 2004/053861 | | 6/2004 |
| WO | WO 2004/057585 A1 | | 7/2004 |
| WO | WO 2004081929 A1 | * | 9/2004 |
| WO | WO 2004/094135 A1 | | 11/2004 |
| WO | WO 2005/056849 A1 | | 6/2005 |

OTHER PUBLICATIONS

U.S. Appl. No. 11/425,062, filed Jun. 19, 2006, Tauchi, et al.
U.S. Appl. No. 11/612,791, filed Dec. 19, 2006, Nakano, et al.
U.S. Appl. No. 12/100,823, filed Apr. 10, 2008, Tauchi, et al.
U.S. Appl. No. 12/167,597, filed Jul. 3, 2008, Takagi, et al.
U.S. Appl. No. 12/183,700, filed Jul. 31, 2008, Tauchi, et al.
U.S. Appl. No. 12/198,520, filed Aug. 26, 2008, Tauchi, et al.
U.S. Appl. No. 12/261,781, filed Oct. 30, 2008, Matsuzaki.
U.S. Appl. No. 12/266,065, filed Nov. 6, 2008, Tauchi, et al.

* cited by examiner

SILVER ALLOY REFLECTIVE FILMS FOR OPTICAL INFORMATION RECORDING MEDIA, SILVER ALLOY SPUTTERING TARGETS THEREFOR, AND OPTICAL INFORMATION RECORDING MEDIA

BACKGROUND OF THE INVENTION

1. Field of the Invention

The present invention relates to silver (Ag) alloy reflective films for optical information recording media, Ag alloy sputtering targets for the deposition thereof, and optical information recording media. More specifically, it relates to reflective films which have low thermal conductivities, low melting temperatures, high reflectivities, and high corrosion resistance and therefore enable marking on optical information recording media such as CDs, DVDs, Blu-ray Discs, and HD-DVDs typically using laser, such as marking of identification numbers in accordance typically to the burst cutting area (BCA) specifications, after the preparation of the media. The present invention also relates to sputtering targets for the deposition of the reflective films, and optical information recording media having the reflective films.

2. Description of the Related Art

Optical information recording media (optical discs) include various types, and the three main types categorized by the writing/reading system are read-only, write-once, and rewritable optical discs.

Of these optical discs, read-only discs have recorded data formed by concave and convex pits on a transparent plastic substrate such as a polycarbonate substrate upon the manufacture of the discs, and a reflective layer mainly containing, for example, Al, Ag, or Au is arranged on the recorded data, as illustrated in FIG. 1. The data are read out by detecting phase difference or reflection difference of laser beam applied to the discs. Certain optical discs include a substrate containing recording pits and a reflective layer arranged on the recording pits, and another substrate bearing recording pits and a semi-reflective layer arranged on the recording pits. The two substrates are laminated, and the data recorded on the two layers are read out. Data recorded on one side according to this recording/reading system are read-only data that cannot be additionally wrote and altered, and optical discs using this system include CD-ROMs, DVD-ROMs, and DVD-Videos. FIG. 1 is a schematic view of the sectional structure of a read-only optical disc. The optical disc in FIG. 1 includes polycarbonate substrates 1 and 5, a semi-reflective layer (Au, Ag alloy, and Si) 2, an adhesive layer 3, and a total-reflective layer (Ag alloy) 4.

These read-only optical discs are produced in quantities, and information is recorded upon production of the discs by pressing with stampers having patterns of the information. Thus, IDs cannot be significantly given to individual discs. However, read-only optical discs individually having IDs formed using a dedicated system such as a label gate system or a burst cutting area (BCA) system after the preparation of the discs are being standardized typically for preventing unauthorized copying, improving traceability in distribution of products, and increasing added values of products. The ID marking (recording) is mainly carried out by a method of applying laser beam to discs after production to melt an Al alloy in the reflective film and to form holes therein.

Aluminum alloys, such as Al—Mg alloys according to Japanese Industrial Standards (JIS) 6061, are distributed in quantities as general construction materials, are inexpensive and are thereby widely used as reflective films of read-only optical discs. In contrast, Ag alloys having higher reflectivities are widely used in recordable (write-once and rewritable) optical discs.

These materials, however, have high thermal conductivities and require high laser power for marking, which results in damages on base materials including polycarbonate substrates and adhesive layers. Additionally, they have low corrosion resistance, and voids formed as a result of laser marking invite corrosion of the reflective film when held under conditions of high temperatures and high humidity after laser marking. Reflective films containing Ag alloys show decreased reflectivities at high temperatures due to cohesion of Ag reflective films caused by the low thermal stability of Ag. In addition, these Ag alloy reflective films show decreased reflectivities and coloring when they are used typically in read-only media and are exposed to sunlight or fluorescent light over a long time. This is probably because Ag is dissolved or forms a reaction product layer as a result of a reaction at the interface between the reflective films and other components such as polycarbonate substrates.

Japanese Laid-open (Unexamined) Patent Application Publication (JP-A) No. 1992-252440 (Hei 04-252440) discloses a method for reducing the thermal conductivity of an Ag alloy by incorporating Ge, Si, Sn, Pb, Ga, In, Tl, Sb, or Bi into Ag. JP-A No. 1992-28032 (Hei 04-28032) discloses a method for reducing the thermal conductivity of an Ag alloy by incorporating Cr, Ti, Si, Ta, Nb, Pt, Ir, Fe, Re, Sb, Zr, Sn, or Ni into Ag. The resulting reflective films obtained according to these techniques, however, are not intended to be melted and removed by laser irradiation, and some of them show increasing melting temperatures with decreasing thermal conductivities thereof. Silver alloys (Ag alloys) satisfying requirements as Ag alloys for laser marking have not yet been provided.

The present inventors have developed Ag alloys which have improved thermal conductivities, laser-beam absorptivities, and corrosion resistance and are suitable for laser marking, by incorporating, for example, Nd, Sn, Gd, and/or In into Ag (Japanese Patent Applications No. 2004-208686 and No. 2005-67262). Thin films using these materials, however, show decreased light stabilities with increasing contents of added elements, although they show reduced thermal conductivities and increased laser-beam absorptivities. Accordingly, demands still have been made to provide materials having both excellent laser marking capabilities and higher resistance to weathering and light.

The laser-beam absorptivity, light resistance, and weather resistance are properties of reflective films acting as follows. Specifically, an increased laser-beam absorptivity enables easier marking of the reflective films by laser beam, i.e., it improves laser marking capability. An increased light resistance inhibits the reduction in reflectivity and the coloring as a result of exposure to sunlight or fluorescent light. An increased weather resistance prevents the reduction in reflectivity due to corrosion or cohesion of Ag under conditions of high temperatures and high humidity. Therefore, Ag alloy reflective films provided for laser marking should have low thermal conductivities, high laser-beam absorptivities, excellent weather resistance, and excellent light resistance.

As is described above, Ag alloy thin films provided for laser marking must have low thermal conductivities, high laser-beam absorptivities, excellent weather resistance, and excellent light resistance.

Current reflective films for read-only optical discs use JIS 6061 series Al alloys, but these Al alloys do not satisfy the requirements for laser marking in thermal conductivity and corrosion resistance (weather resistance).

SUMMARY OF THE INVENTION

Under these circumstances, an object of the present invention is to provide an Ag alloy reflective film for optical information recording media which can be easily marked by laser beam when used in read-only optical discs. Another object of the present invention is to provide an optical information recording medium having the reflective film, and a sputtering target for the deposition of the reflective film.

After intensive investigations to achieve the above objects, the present inventors have found that an Ag alloy thin film containing Ag and specific contents of specific alloying elements has a low thermal conductivity and high resistance to weathering and light and serves as a reflective thin layer (thin metal layer) suitable as a reflective film for optical information recording media that can satisfactorily undergo laser marking. The present invention has been accomplished based on these findings and has achieved the above objects.

Accordingly, the present invention relates to Ag alloy reflective films for optical information recording media, optical information recording media, and Ag alloy sputtering targets for the deposition of the Ag alloy reflective films and provides Ag alloy reflective films for optical information recording media in a first aspect, optical information recording media in a second aspect, and Ag alloy sputtering targets for the deposition of the Ag alloy reflective films in a third aspect.

Specifically, the present invention provides, in the first aspect, an Ag alloy reflective film for optical information recording media, containing Ag as a main component, a total of 1 to 10 atomic percent of at least one selected from the group consisting of Nd, Gd, Y, Sm, La, and Ce, and a total of 2 to 10 atomic percent of at least one selected from the group consisting of Li, Mg, Al, Zn, Cu, Pt, Au, Pd, Ru, and Rh.

The Ag alloy reflective film can further contain 0.01 to 3 atomic percent of at least one of Bi and Sb.

The Ag alloy reflective film can also contain 2 to 10 atomic percent of at least one selected from the group consisting of In, Sn, and Pb, instead of or in addition to the at least one of Bi and Sb.

The present invention also provides, in the second aspect, an optical information recording medium containing the Ag alloy reflective film according to the first aspect.

In the optical information recording medium, the Ag alloy reflective film can have an identifying mark formed by the action of laser beam.

The optical information recording medium can contain two or more layers of the Ag alloy reflective film, and the two or more layers can have the same composition.

In addition and advantageously, the present invention provides, in the third aspect, an Ag alloy sputtering target for the deposition of Ag alloy reflective films for optical information recording media, containing Ag as a main component, a total of 1 to 10 atomic percent of at least one selected from the group consisting of Nd, Gd, Y, Sm, La, and Ce, and a total of 2 to 10 atomic percent of at least one selected from the group consisting of Li, Mg, Al, Zn, Cu, Pt, Au, Pd, Ru, and Rh.

The Ag alloy sputtering target can further contain 0.01 to 3 atomic percent of Sb.

The Ag alloy sputtering target can further contain 0.03 to 10 atomic percent of Bi.

The Ag alloy sputtering target can further contain 2 to 10 atomic percent of at least one selected from the group consisting of In, Sn, and Pb, instead of or in addition to Sb and/or Bi.

The Ag alloy reflective films for optical information recording media according to the present invention can be easily marked by laser beam when used in read-only optical discs. The optical information recording media according to the present invention include the Ag alloy reflective films and can be suitably marked by laser beam when used as read-only optical discs. By using the Ag alloy sputtering targets according to the present invention, the Ag alloy reflective films can be deposited.

Further objects, features and advantages of the present invention will become apparent from the following description of the preferred embodiments with reference to the attached drawing.

DESCRIPTION OF THE PREFERRED EMBODIMENTS

Figure 1:
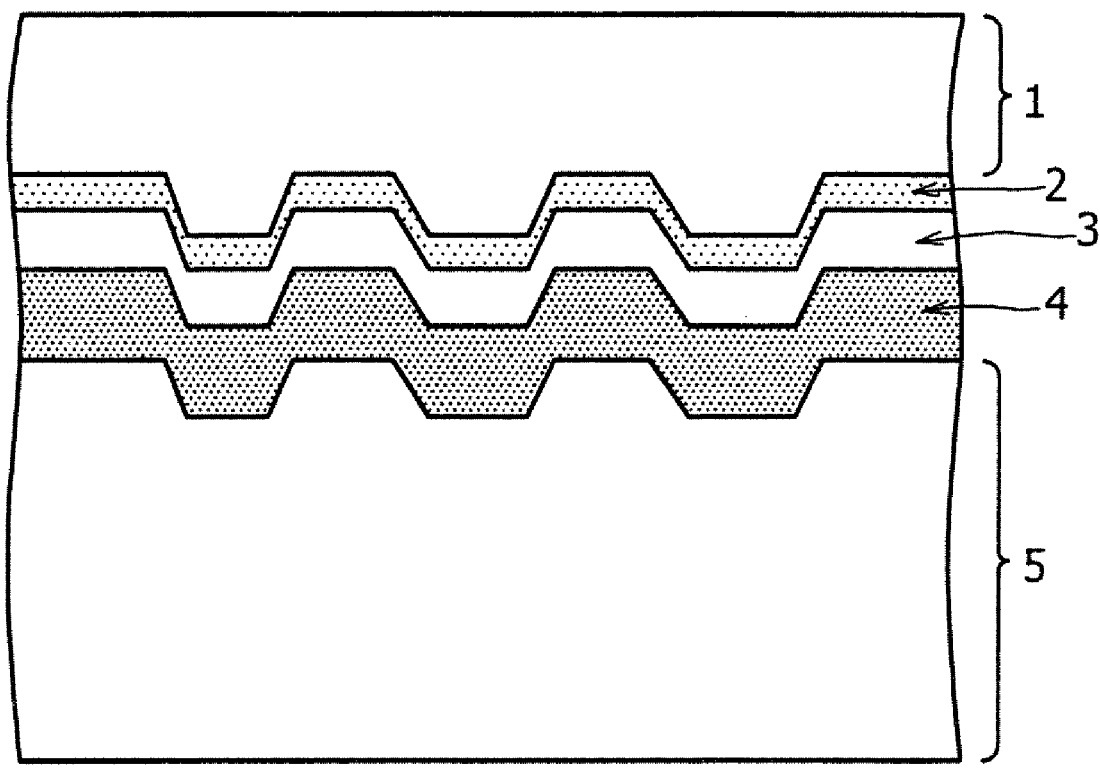
FIG. 1 is a schematic view of the sectional structure of a read-only optical disc.

As is described above, Ag alloy thin films provided for laser marking must have low thermal conductivities, high laser-beam absorptivity, and excellent resistance to light and weathering.

The present inventors made Ag alloy sputtering targets containing Ag and a variety of elements, produced Ag alloy thin films having various compositions by sputtering using these targets, determined the compositions and properties of the thin films as reflective thin layers, and found the following findings (1) to (5).

(1) By incorporating into Ag a total of 1 to 10 atomic percent of at least one selected from the group consisting of Nd, Gd, Y, Sm, La, and Ce, the thermal conductivity can be reduced and the laser-beam absorptivity can be increased (the laser marking capability can be increased) without elevating the melting temperature (liquidus temperature). In addition, the reduction in reflectivity due to cohesion of Ag under conditions of high temperatures and high humidity can be prevented, i.e., the weather resistance can be improved. If the total content of these elements is less than 1 atomic percent ("atomic percent" is hereinafter also referred to as "%", unless otherwise specified), the above-mentioned advantages are insufficient. With an increasing total content of these elements, the thermal conductivity can be reduced and the laser-beam absorptivity can be increased, but the reflectivity is reduced. The reflectivity is unacceptably reduced if the total content of these elements exceeds 10%. Accordingly, the total content of these elements must be 1% to 10% and is preferably 1.5% to 5%

(2) By incorporating a total of 2% to 10% of at least one selected from the group consisting of Li, Mg, Al, Zn, Cu, Pt, Au, Pd, Ru, and Rh, the reduction in reflectivity upon exposure to sunlight or fluorescent light can be inhibited, i.e., the light resistance can be improved. However, these elements do not so effectively reduce the thermal conductivity and increase the laser-beam absorptivity even with an increasing total content thereof. Of these elements, Li, Mg, Al, Zn, and Cu probably act as follows. These elements are enriched at the interface between the reflective film and a polycarbonate substrate to inhibit the reaction between the reflective film and the polycarbonate substrate to thereby prevent Ag from dissolving out or forming a reaction product layer upon exposure to light. Pt, Au, Pd, Ru, and Rh are nobler than Ag and probably act to inhibit the reaction between Ag and the polycarbonate substrate. If the total content of these elements is less than 2%, the light resistance is not so effectively improved. The light resistance is further improved with an increasing content of these elements. However, if it exceeds 10%, the reflectivity undesirably decreases. From these viewpoints, the total content of these elements must be 2% to 10%.

(3) By incorporating at least one of Bi and Sb in addition to the elements described in (1) and (2), the reduction in reflectivity under conditions of high temperatures and high humidity can further be satisfactorily inhibited, i.e., the weather resistance can further be improved. However, the total contents of these elements are preferably 3% or less, because the reflectivity decreases as a result of alloying of these elements. In contrast, sufficient advantages of alloying of these elements may not be obtained if the total content is less than 0.01%. From these viewpoints, the total content of these element is preferably 0.01% to 3% and more preferably 0.1% to 2%.

(4) By further incorporating at least one selected from the group consisting of In, Sn, and Pb, the thermal conductivity can be significantly decreased. However, the total content of these elements is preferably 10% or less, because the reflectivity decreases as a result of alloying of these elements. These elements do not so effectively increase the durability of reflective film. To exhibit the advantages of these elements effectively, the total content thereof is preferably 2% or more.

(5) By adjusting the contents of the elements in (1) to (4), the thermal conductivity can be reduced to 0.8 W/(K·cm) or less and the laser beam-absorptivity with respect to laser beam at wavelengths of 380 to 1000 nm can be increased to 8% or more. Thus, excellent laser marking capability can be obtained.

The present invention has been achieved based on these findings and provides Ag alloy reflective films for optical recording media, optical information recording media using the reflective films, and Ag alloy sputtering targets for the deposition of the Ag alloy reflective films which have the above-mentioned configurations.

The Ag alloy reflective films for optical recording media according to the first aspect of the present invention comprise Ag as a main component, a total of 1 to 10 atomic percent of at least one selected from the group consisting of Nd, Gd, Y, Sm, La, and Ce, and a total of 2 to 10 atomic percent of at least one selected from the group consisting of Li, Mg, Al, Zn, Cu, Pt, Au, Pd, Ru, and Rh.

As is obvious from the above findings (1) and (2), the Ag alloy reflective films for optical information recording media have low thermal conductivities, low melting temperatures (liquidus temperatures), and high laser-beam absorptivities. They can therefore be marked by laser beam at a lower power. In addition, they are excellent in laser marking capability and can be easily marked by laser beam. They are less decreased in reflectivity under conditions of high temperatures and high humidity, i.e., they are excellent in weather resistance. In addition, they are less decreased in reflectivity upon exposure to sunlight or fluorescent light, i.e., they are excellent in light resistance.

Accordingly, the Ag alloy reflective films according to the present invention can be satisfactorily marked by laser beam, and are advantageously used as reflective films for optical information recording media. Specifically, they can be easily marked by laser beam at a lower power, and the reduction of reflectivity thereof under conditions of high temperatures and high humidity or upon exposure to sunlight or fluorescent light can be inhibited.

The reduction in reflectivity of the reflective films under conditions of high temperatures and high humidity can further be inhibited by incorporating 0.01% to 3% of at least one of Bi and Sb, as is obvious from the finding (3).

The thermal conductivities of the Ag alloy reflective films can further significantly be reduced by incorporating 2% to 10% of at least one selected from the group consisting of In, Sn, and Pb, as is obvious from the finding (4).

The thickness of the Ag alloy reflective films is preferably 10 nm to 100 nm and more preferably 12 nm to 50 nm. The reasons for specifying the range will be described below. Laser marking can be carried out more easily with a decreasing thickness of the reflective film. However, if the thickness is as small as less than 10 nm, the reflective film may transmit the laser beam excessively and thereby have a reduced reflectivity. Thus, the thickness is preferably 10 nm or more, and more preferably 12 nm or more. In contrast, if the Ag alloy reflective film has an excessively large thickness as large as exceeding 100 nm, the laser power to melt the reflective film must be increased, and marks become difficult to form. Thus, the thickness is preferably 100 nm or less, and more preferably 50 nm or less. Additionally, the surface smoothness of the film decreases and the laser beam may become susceptible to scattering with an increasing thickness of the film, to fail to yield high signal output. Thus, the thickness is preferably 100 nm or less and more preferably 50 nm or less.

Laser beams with wavelengths of 800 to 810 nm are generally used for laser marking, but those with wavelengths of 320 to 800 nm can also be used herein. In this case, the contents of alloying elements can be reduced, because the Ag alloy reflective films according to the present invention show increasing laser-beam absorptivities with decreasing wavelengths of laser beams.

The optical information recording media according to the present invention comprise any of the Ag alloy reflective films according to the present invention. They can be satisfactorily marked by laser beam and avoid thermal damages of constitutional components of discs, such as polycarbonate substrates and adhesive layers, due to excessive laser power. They are resistant to the reduction in reflectivity due to corrosion or cohesion under conditions of high temperatures and high humidity or upon exposure to sunlight or fluorescent light.

The optical information recording media according to the present invention have the above-mentioned excellent properties and can be advantageously marked by laser beam. By subjecting them to laser marking, the optical information recording media can have identifying marks on their Ag alloy reflective films formed by laser marking.

The optical information recording media according to the present invention can each have one or more layers of the Ag alloy reflective films. When they have two or more layers of the Ag alloy reflective films, the layers can have fully or partially different compositions from each other or the same composition with each other.

The Ag alloy sputtering targets according to the third aspect of the present invention each comprise Ag as a main component, a total of 1% to 10% of at least one selected from the group consisting of Nd, Gd, Y, Sm, La, and Ce, and a total of 2% to 10% of at least one selected from the group consisting of Li, Mg, Al, Zn, Cu, Pt, Au, Pd, Ru, and Rh. These Ag alloy sputtering targets can yield the Ag alloy reflective films for optical recording media according to the present invention.

The Ag alloy sputtering targets according to the present invention can further comprise 0.01% to 3% of Sb. The resulting Ag alloy sputtering targets can yield, of the Ag alloy reflective films for optical information recording media according to the present invention, those further comprising 0.01% to 3% of Sb. The Ag alloy sputtering targets can further comprise 0.03% to 10% of Bi. The resulting Ag alloy sputtering targets can yield, of the Ag alloy reflective films for optical information recording media according to the present invention, those further comprising 0.01% to 3% of Bi. In this connection, the contents of Nd, Gd, Y, Sm, La, Ce, Li, Mg, Al, Zn, Cu, Pt, Au, Pd, Ru, Rh, and Sb in the sputtering targets are reflected to the contents of the elements in the resulting reflective films, but the Bi content of the reflective film decreases to several tens of percent of the Bi content of the sputtering targets. Therefore, the Ag alloy sputtering targets have the above-specified composition (contents of elements).

The Ag alloy sputtering targets according to the present invention can further comprise 2% to 10% of at least one selected from the group consisting of In, Sn, and Pb. The resulting sputtering targets can yield, of the Ag alloy reflective film for optical recording media according to the present invention, those further 2% to 10% of at least one selected from the group consisting of In, Sn, and Pb. In this connection, the contents of In, Sn, and Pb in the sputtering targets are reflected to the contents of the elements in the resulting reflective films.

EXAMPLE

The present invention will be illustrated in further detail with reference to several examples and comparative examples below. It is to be noted that the followings are only examples which by no means limit the scope of the present invention, and various changes and modifications are possible therein without departing from the teaching and scope of the present invention. Herein after an Ag alloy comprising elements $M_1$ and $M_2$ is indicated as Ag-$M_1$-$M_2$ alloy, and an Ag alloy comprising elements $M_1$, $M_2$ and $M_3$ is indicated as Ag-$M_1$-$M_2$-$M_3$ alloy. Likewise, "Ag-x$M_1$-y$M_2$ alloy" means an Ag alloy comprising "x" atomic percent of $M_1$, and "y" atomic percent of $M_2$, and "Ag-x$M_1$-y$M_2$-z$M_3$ alloy" means an Ag alloy comprising "x" atomic percent of $M_1$, "y" atomic percent of $M_2$, and "z" atomic percent of $M_3$.

Experimental Example 1

Ag alloy thin film shaving the compositions in Table 1, namely, Ag-3Nd—(Li, Au) alloy thin films [Ag alloy thin films containing 3% of Nd, and one of Li and Au] [Nos. 1 to 10], Ag—Nd-5Li alloy thin films [Nos. 11 to 14], Ag—(Y, Ce, Gd, Sm, La)—(Li, Mg, Al, Zn, Cu, Pt, Pd, Ru, Rh) alloy thin films [Nos. 15 to 27], and an Ag-5Nd alloy thin film [No. 28] were deposited. The thermal conductivities, laser-beam absorptivities, reflectivities, weather resistance, light resistance, and laser marking capabilities of the thin films were determined. The relationships between these properties and the contents of Li and Au were determined on the Ag-3Nd—(Li, Au) alloy thin films [Nos. 1 to 10]. Likewise, the relationships between these properties and the content of Nd were determined on the Ag—Nd-5Li alloy thin films [Nos. 11 to 14]. How the type of the alloying elements affects the properties was determined on the Ag—(Y, Ce, Gd, Sm, La)—(Li, Mg, Al, Zn, Cu, Pt, Pd, Ru, Rh) alloy thin films [Nos. 15 to 27] and the Ag-5Nd alloy thin film [No. 28].

The thin films were deposited in the following manner. On a polycarbonate substrate having a diameter of 120 mm and a thickness of 0.6 mm were deposited Ag—Nd—In alloy thin films, Ag—Gd—In alloy thin films, and Ag—Y—In alloy thin films, respectively, by DC magnetron sputtering. The deposition was carried out at a substrate temperature of 22° C., an Ar gas pressure of 3 m Torr, a deposition rate of 30 nm/sec, and a back pressure of $5 \times 10^{-6}$ Torr or less. The sputtering targets used herein were composite targets each comprising a pure Ag target on which chips of alloying elements were placed.

The thermal conductivity was converted from the electrical resistance of a sample Ag alloy thin film deposited to a thickness of 100 nm. The reflectivity of a sample Ag alloy thin film was measured using the V-570 Ultraviolet and Visible Ray Spectrometer (JASCO Corporation) and this was defined as the reflectivity. The laser-beam absorptivity was measured using laser beam at a wavelength of 810 nm, which laser beam is generally used for recording according to the burst cutting area (BCA) specifications.

The weather resistance of a sample thin film was evaluated by how the reflectivity decreased after a test in which the thin film was held under conditions of high temperatures of 80° C. and high humidity of 90% relative humidity (RH) for 100 hours, as compared with before the test. The reflectivities of the sample thin film before and after the test were determined at a wave length of 405 nm.

The light resistance of a sample thin film was evaluated by how the reflectivity decreased after an exposure test in which the thin film was exposed to sunlight in sunny weather for a total of 40 hours, as compared with before the test. The reflectivities of the sample thin film before and after the exposure test were determined at a wavelength of 405 nm.

The laser marking capability was evaluated as follows. A sample thin film was marked by laser beam using the POP-120-8R (Hitachi Computer Peripherals Co., Ltd.) at a beam speed of 10 meters per second and a duty ratio of 40%. The laser power necessary for the marking was determined within the range of 1.5 to 4 W in steps of 0.5 W. The laser marking capability was evaluated according to the three criteria. Specifically, a sample that was marked at a laser power of 1.5W or less was evaluated as "Excellent", one that was marked at a laser power of 2 to 3 W was evaluated as "Good", and one that was marked at a laser power of 3.5 W or more was evaluated as "Poor".

The results are shown in Table 1. In the Ag-3Nd—(Li, Au) alloy thin films [Nos. 1 to 10], the Nd content was fixed at 3% and the Li and Au contents were varied. As having a Nd content of 3%, these thin films satisfy, of the requirements according to the present invention, the requirement of the total content of at least one selected from the group consisting of Nd, Gd, Y, Sm, La, and Ce of 1% to 10%. Some of them satisfy the requirement of the total content of at least one selected from the group consisting of Li, Mg, Al, Zn, Cu, Pt, Au, Pd, Ru, and Rh of 2% to 10%, but the others do not.

In the Ag—Nd-5Li alloy thin films [Nos. 11 to 14], the Li content was fixed at 5% and the Nd content was varied. As having a Li content of 5%, these thin films satisfy, of the requirements according to the present invention, the requirement of the total content of at least one selected from the group consisting of Li, Mg, Al, Zn, Cu, Pt, Au, Pd, Ru, and Rh of 2% to 10%. Some of them satisfy the requirement of the total content of at least one selected from the group consisting of Nd, Gd, Y, Sm, La, and Ce of 1% to 10%, but the others do not. The Ag—(Y, Ce, Gd, Sm, La)—(Li, Mg, Al, Zn, Cu, Pt, Pd, Ru, Rh) alloy thin films satisfy all the requirements according to the present invention.

Table 1 demonstrates that, of the Ag-3Nd—(Li, Au) alloy thin films [Nos. 1 to 10], one having a Li content less than 2% [No. 1] and one having an Au content less than 2% [No. 6] have poor light resistance, thereby show significantly decreased reflectivities after the light resistance tests (exposure tests), and are poor in laser marking capability (Poor). One having a Li content exceeding 10% [No. 5] and one having an Au content exceeding 10% [No.10] have low reflectivities. In contrast, those having a Li content of 2% to 10% [Nos. 2 to 4] and those having an Au content of 2% to 10% [Nos. 7 to 9] have excellent light resistance, thereby show less reduction in reflectivity after the light resistance tests (exposure tests), and have good laser marking capability (Good).

Of the Ag—Nd-5Li alloy thin films [Nos. 11 to 14], one having a Nd content less than 1% [No. 11] has an insufficiently reduced thermal conductivity, i.e., high thermal conductivity, has an insufficiently increased laser-beam absorptivity, i.e., low laser-beam absorptivity, and shows poor laser marking capability (Poor). This thin film shows significantly reduced reflectivity after held under conditions of high temperatures and high humidity, indicating that the reduction in reflectivity is not sufficiently prevented. One having a Nd content exceeding 10% [No. 14] shows an insufficient, low reflectivity. In contrast, those having a Nd content of 1% to 10% [Nos. 12 and 13] have effectively reduced thermal conductivities, i.e., low thermal conductivities and show effectively increased laser-beam absorptivities, i.e., high laser-beam absorptivities. Thus, they have excellent or good laser marking capability. They are sufficiently prevented from decreasing in reflectivity under conditions of high temperatures and high humidity.

The Ag—(Y, Ce, Gd, Sm, La)—(Li, Mg, Al, Zn, Cu, Pt, Pd, Ru, Rh) alloy thin films [Nos. 15 to 27] each have a content of one of Y, Ce, Gd, Sm, and La of 5% and a content of one of Li, Mg, Al, Zn, Cu, Pt, Pd, Ru, and Rh of 5%. They satisfy the requirement of the total content of at least one selected from the group consisting of Nd, Gd, Y, Sm, La, and Ce of 1% to 10% and the requirement of the total content of at least one selected from the group consisting of Li, Mg, Al, Zn, Cu, Pt, Au, Pd, Ru, and Rh of 2% to 10%. Namely, they satisfy the requirements according to the present invention. All these thin films are superior in light resistance to the Ag-5Nd alloy thin film [No. 28] and show less reduction in reflectivity after the light resistance test (exposure test), indicating that the reduction in reflectivity is sufficiently prevented.

These results demonstrate that Ag alloy thin films must satisfy the requirement of the total content of at least one selected from the group consisting of Nd, Gd, Y, Sm, La, and Ce of 1% to 10% and the requirement of the total content of at least one selected from the group consisting of Li, Mg, Al, Zn, Cu, Pt, Au, Pd, Ru, and Rh of 2% to 10%, namely, they must satisfy the requirements according to the present invention.

Experimental Example 2

Ag alloy thin films having the compositions in Table 2, i.e., Ag-3Nd-5Li—(Bi, Sb) alloy thin films [Nos. 1a to 8a] were deposited, and their thermal conductivities, laser-beam absorptivities, reflectivities, weather resistance, light resistance, and laser marking capabilities were determined, by the procedures of Experimental Example 1.

The results are shown in Table 2. The Ag alloy thin films have compositions satisfying the requirements according to the present invention while their Bi and Sb contents are varied. Consequently, some of them satisfy the preferred requirement in the present invention, i.e., the content of at least one of Bi and Sb of 0.01% to 3%, and the others do not.

Table 2 demonstrates that the weather resistance increases with an increasing Bi content, which prevents the reduction in reflectivity under conditions of high temperatures and high humidity.

Experimental Example 3

Ag alloy thin films having the compositions in Table 3, i.e., Ag-3Nd-5Li—(Sn, Pb) alloy thin films [Nos. 1b to 10b] were deposited, and their thermal conductivities, laser-beam absorptivities, reflectivities, weather resistance, light resistance, and laser marking capabilities were determined, by the procedures of Experimental Example 1.

The results are shown in Table 3. The Ag alloy thin films have compositions satisfying the requirements according to the present invention while their Sn and Pb contents are varied. Consequently, some of them satisfy the preferred requirement in the present invention, i.e., the content of at least one selected from the group consisting of In, Sn, and Pb of 2% to 10%, and the others do not.

Table 3 demonstrates that the thermal conductivity decreases and the laser-beam absorptivity increases with an increasing Sn or Pb content, indicating that these elements act to further improve the laser marking capability.

TABLE 1

| No. | Composition | Electrical resistivity (μΩcm) | Thermal conductivity [W/(cm·K)] | Reflectivity (%) Before test | After weather resistance test | After light resistance test | Laser-beam absorptivity (%) | Laser marking capability |
|---|---|---|---|---|---|---|---|---|
| 1 | Ag—3Nd—0.5Li | 20.8 | 0.37 | 77.3 | 72.4 | 66.9 | 9.6 | Poor |
| 2 | Ag—3Nd—2Li | 21.6 | 0.36 | 75.2 | 70.7 | 68.8 | 10.5 | Good |
| 3 | Ag—3Nd—5Li | 23.8 | 0.32 | 74.8 | 69.7 | 69.2 | 12.4 | Good |
| 4 | Ag—3Nd—10Li | 25.1 | 0.31 | 70.1 | 66.2 | 68.3 | 14.9 | Good |
| 5 | Ag—3Nd—12Li | 27.9 | 0.28 | 68.1 | 53.2 | 65.1 | 15.3 | Excellent |
| 6 | Ag—3Nd—1Au | 20.1 | 0.38 | 77.3 | 73.1 | 68.9 | 8.1 | Poor |
| 7 | Ag—3Nd—2Au | 20.9 | 0.37 | 74.2 | 73.2 | 69.1 | 10.1 | Good |
| 8 | Ag—3Nd—5Au | 21.5 | 0.36 | 72.7 | 69.2 | 70.1 | 11.1 | Good |
| 9 | Ag—3Nd—10Au | 22.8 | 0.34 | 66.1 | 65.1 | 67.2 | 12.2 | Good |
| 10 | Ag—3Nd—12Au | 23.9 | 0.32 | 63.8 | 62.5 | 63.1 | 13.2 | Good |
| 11 | Ag—0.5Nd—5Li | 6.3 | 1.22 | 87.3 | 73.8 | 74.1 | 4.8 | Poor |
| 12 | Ag—5Nd—5Li | 28.1 | 0.27 | 70.6 | 69.2 | 68.1 | 15.3 | Good |
| 13 | Ag—10Nd—5Li | 53.6 | 0.14 | 63.1 | 60.1 | 63.4 | 20.3 | Excellent |
| 14 | Ag—15Nd—5Li | 76.3 | 0.10 | 50.1 | 46.1 | 48.1 | 31.5 | Excellent |
| 15 | Ag—3Y—5Li | 22.8 | 0.34 | 75.2 | 72.3 | 70.5 | 12.3 | Good |
| 16 | Ag—3Ce—5Li | 23.4 | 0.33 | 74.5 | 70.3 | 70.3 | 12.6 | Good |
| 17 | Ag—3Gd—5Li | 25.9 | 0.30 | 72.3 | 71.3 | 69.8 | 13.2 | Good |
| 18 | Ag—3Sm—5Li | 22.4 | 0.34 | 76.1 | 70.9 | 68.1 | 12.0 | Good |
| 19 | Ag—3La—5Li | 23.1 | 0.33 | 74.0 | 71.6 | 72.3 | 12.6 | Good |
| 20 | Ag—5Gd—5Pd | 32.6 | 0.24 | 68.1 | 66.1 | 66.2 | 13.8 | Good |
| 21 | Ag—5Gd—5Pt | 34.8 | 0.22 | 66.2 | 60.3 | 61.5 | 14.8 | Good |
| 22 | Ag—5Gd—5Ru | 33.2 | 0.23 | 64.3 | 61.5 | 62.1 | 13.9 | Good |

TABLE 1-continued

| No. | Composition | Electrical resistivity (μΩcm) | Thermal conductivity [W/(cm·K)] | Reflectivity (%) Before test | After weather resistance test | After light resistance test | Laser-beam absorptivity (%) | Laser marking capability |
|---|---|---|---|---|---|---|---|---|
| 23 | Ag—5Gd—5Rh | 32.1 | 0.24 | 65.8 | 63.2 | 61.3 | 13.4 | Good |
| 24 | Ag—5Gd—5Zn | 30.5 | 0.25 | 66.2 | 60.1 | 62.3 | 14.7 | Good |
| 25 | Ag—5Gd—5Al | 38.1 | 0.20 | 61.2 | 57.6 | 56.9 | 16.3 | Excellent |
| 26 | Ag—5Gd—5Cu | 30.1 | 0.26 | 67.5 | 65.3 | 65.4 | 12.9 | Good |
| 27 | Ag—5Gd—5Mg | 33.5 | 0.23 | 64.3 | 61.8 | 64.1 | 13.8 | Good |
| 28 | Ag—5Nd | 26.9 | 0.29 | 75.7 | 72.3 | 64.3 | 10.0 | Good |

TABLE 2

| No. | Composition | Electrical resistivity (μΩcm) | Thermal conductivity [W/(cm·K)] | Reflectivity (%) Before test | After weather resistance test | After light resistance test | Laser-beam absorptivity (%) | Laser marking capability |
|---|---|---|---|---|---|---|---|---|
| 1a | Ag—3Nd—5Li | 23.8 | 0.32 | 74.8 | 69.7 | 69.2 | 12.4 | Good |
| 2a | Ag—3Nd—5Li—0.05Bi | 23.2 | 0.33 | 74.3 | 68.1 | 68.9 | 12.6 | Good |
| 3a | Ag—3Nd—5Li—0.11Bi | 23.9 | 0.32 | 74.1 | 70.8 | 69.8 | 13.1 | Good |
| 4a | Ag—3Nd—5Li—0.5Bi | 24.6 | 0.31 | 73.5 | 72.5 | 69.4 | 13.6 | Good |
| 5a | Ag—3Nd—5Li—1.0Bi | 25.3 | 0.30 | 72.3 | 72.8 | 68.9 | 14.0 | Good |
| 6a | Ag—3Nd—5Li—3.0Bi | 31.0 | 0.25 | 63.5 | 60.3 | 58.6 | 16.6 | Good |
| 7a | Ag—3Nd—3Au—0.5Bi | 21.3 | 0.36 | 77.8 | 78.5 | 70.5 | 12.8 | Good |
| 8a | Ag—3Nd—5Li—1.0Sb | 26.9 | 0.29 | 71.1 | 68.3 | 66.1 | 14.3 | Good |

TABLE 3

| No. | Composition | Electrical resistivity (μΩcm) | Thermal conductivity [W/(cm·K)] | Reflectivity (%) Before test | After weather resistance test | After light resistance test | Laser-beam absorptivity (%) | Laser marking capability |
|---|---|---|---|---|---|---|---|---|
| 1b | Ag—3Nd—5Li | 23.8 | 0.32 | 74.8 | 69.7 | 69.2 | 12.4 | Good |
| 2b | Ag—3Nd—5Li—1Sn | 26.9 | 0.29 | 72.3 | 71.3 | 72.3 | 14.8 | Good |
| 3b | Ag—3Nd—5Li—2Sn | 30.1 | 0.26 | 70.3 | 68.3 | 68.5 | 17.6 | Excellent |
| 4b | Ag—3Nd—5Li—5Sn | 38.9 | 0.20 | 62.3 | 59.6 | 60.2 | 20.6 | Excellent |
| 5b | Ag—3Nd—5Li—10Sn | 50.6 | 0.15 | 50.1 | 42.3 | 47.2 | 28.3 | Excellent |
| 6b | Ag—3Nd—5Li—1Sn | 25.9 | 0.30 | 71.2 | 70.9 | 72.1 | 13.9 | Good |
| 7b | Ag—3Nd—5Li—2Sn | 29.4 | 0.26 | 69.2 | 67.9 | 70.1 | 16.9 | Excellent |
| 8b | Ag—3Nd—5Li—5Sn | 40.1 | 0.19 | 63.8 | 58.3 | 62.9 | 22.1 | Excellent |
| 9b | Ag—3Nd—5Li—10Sn | 53.3 | 0.14 | 50.3 | 40.9 | 46.8 | 29.6 | Excellent |
| 10b | Ag—3Nd—5Li—3Pb | 33.6 | 0.23 | 67.8 | 65.1 | 68.2 | 18.9 | Excellent |

The Ag alloy reflective films for optical information recording media according to the present invention can be easily marked by laser beam when used in read-only optical discs and are useful and advantageous as reflective films for optical information recording media such as read-only optical discs.

What is claimed is:

1. An Ag alloy reflective film for optical information recording media, consisting of:
   Ag as a main component;
   a total of 1 to 10 atomic percent of at least one selected from the group consisting of Gd, Y, Sm, La, and Ce;
   a total of 2 to 10 atomic percent of at least one selected from the group consisting of Li, Mg, Al, Zn, Cu, Pt, Au, Pd, Ru, and Rh; and
   2 to 10 atomic percent of at least one selected from the group consisting of In, Sn, and Pb.

2. An optical information recording medium comprising the Ag alloy reflective film of claim 1.

3. The optical information recording medium of claim 2, wherein the Ag alloy reflective film has an identifying mark formed by the action of laser beam.

4. The optical information recording medium of claim 2, wherein the medium comprise two or more layers of the Ag alloy reflective film, and wherein the two or more layers have the same composition.

5. An Ag alloy sputtering target for the deposition of Ag alloy reflective films for optical information recording media, consisting of:
   Ag as a main component;
   a total of 1 to 10 atomic percent of at least one selected from the group consisting of Gd, Y, Sm, La, and Ce;
   a total of 2 to 10 atomic percent of at least one selected from the group consisting of Li, Mg, Al, Zn, Cu, Pt, Au, Pd, Ru, and Rh; and
   2 to 10 atomic percent of at least one selected from the group consisting of In, Sn, and Pb.

6. The Ag alloy reflective film of claim 1, wherein the amount of said at least one selected from the group consisting of Gd, Y, Sm, La, and Ce ranges from 1.5 to 5 atomic percent.

7. The Ag alloy reflective film of claim 1, wherein the thermal conductivity of said Ag alloy reflective film is 0.8 W/(K·cm) or less.

8. The Ag alloy reflective film of claim 1, wherein the laser beam-absorptivity with respect to laser beam at wavelengths of 380 to 1000 nm is at least 8%.

9. The Ag alloy reflective film accordingly to claim 1, wherein Gd is present in an amount of 1 to 10 atomic percent.

10. The Ag alloy reflective film accordingly to claim 1, wherein Y is present in an amount of 1 to 10 atomic percent.

11. The optical information recording medium of claim 2, wherein the thickness of the Ag alloy reflective film ranges from 10 nm to 100 nm.

12. The optical information recording medium of claim 2, wherein the thickness of the Ag alloy reflective film ranges from 12 nm to 50 nm.

13. The Ag alloy sputtering target of claim 5, wherein Gd is present in an amount of 1 to 10 atomic percent.

14. The Ag alloy sputtering target of claim 5, wherein Y is present in an amount of 1 to 10 atomic percent.

* * * * *